United States Patent [19]
Geyer

[11] 3,871,810
[45] Mar. 18, 1975

[54] EXTRUDER AND ROLLER-DIE COMBINATION

[75] Inventor: Paul Geyer, Detroit, Mich.

[73] Assignee: Uniroyal, Inc., New York, N.Y.

[22] Filed: Nov. 20, 1972

[21] Appl. No.: 308,161

[52] U.S. Cl. ............... 425/374, 425/376, 425/465
[51] Int. Cl. ............................................. B29f 3/012
[58] Field of Search .......... 425/327, 374, 461, 465, 425/466, 418, 376, 377, 378, 379, 380, 381, 382; 264/175, 176 R

[56] References Cited
UNITED STATES PATENTS

| | | | |
|---|---|---|---|
| 1,744,130 | 1/1930 | McChesney et al. ............ | 425/380 X |
| 2,892,212 | 6/1959 | Rhodes ............................ | 425/374 X |
| 3,142,091 | 7/1964 | Curtiss ............................ | 425/374 X |
| 3,394,431 | 7/1968 | Nalle, Jr. ........................ | 425/71 |
| 3,515,778 | 6/1970 | Fields et al. .................... | 425/327 X |

*Primary Examiner*—R. Spencer Annear
*Assistant Examiner*—Mark Rosenbaum
*Attorney, Agent, or Firm*—Philip Sands, Esq.

[57] ABSTRACT

An apparatus for forming a continuous elastomeric strip, the method comprising extruding an elastomeric mass under pressure between mutually confronting stationary and movable surfaces, the stationary and movable surfaces converging toward one another and cooperatively defining a pressure chamber therebetween, and reducing the cross-sectional thickness of the elastomeric mass under increased pressure as the latter is passed through a restriction orifice at an end of the chamber. The stationary and movable surfaces, pursuant to the apparatus herein, comprise, respectively, a stationary extrusion die-blade and a driven roller confronted by and spaced from the die-blade.

2 Claims, 19 Drawing Figures

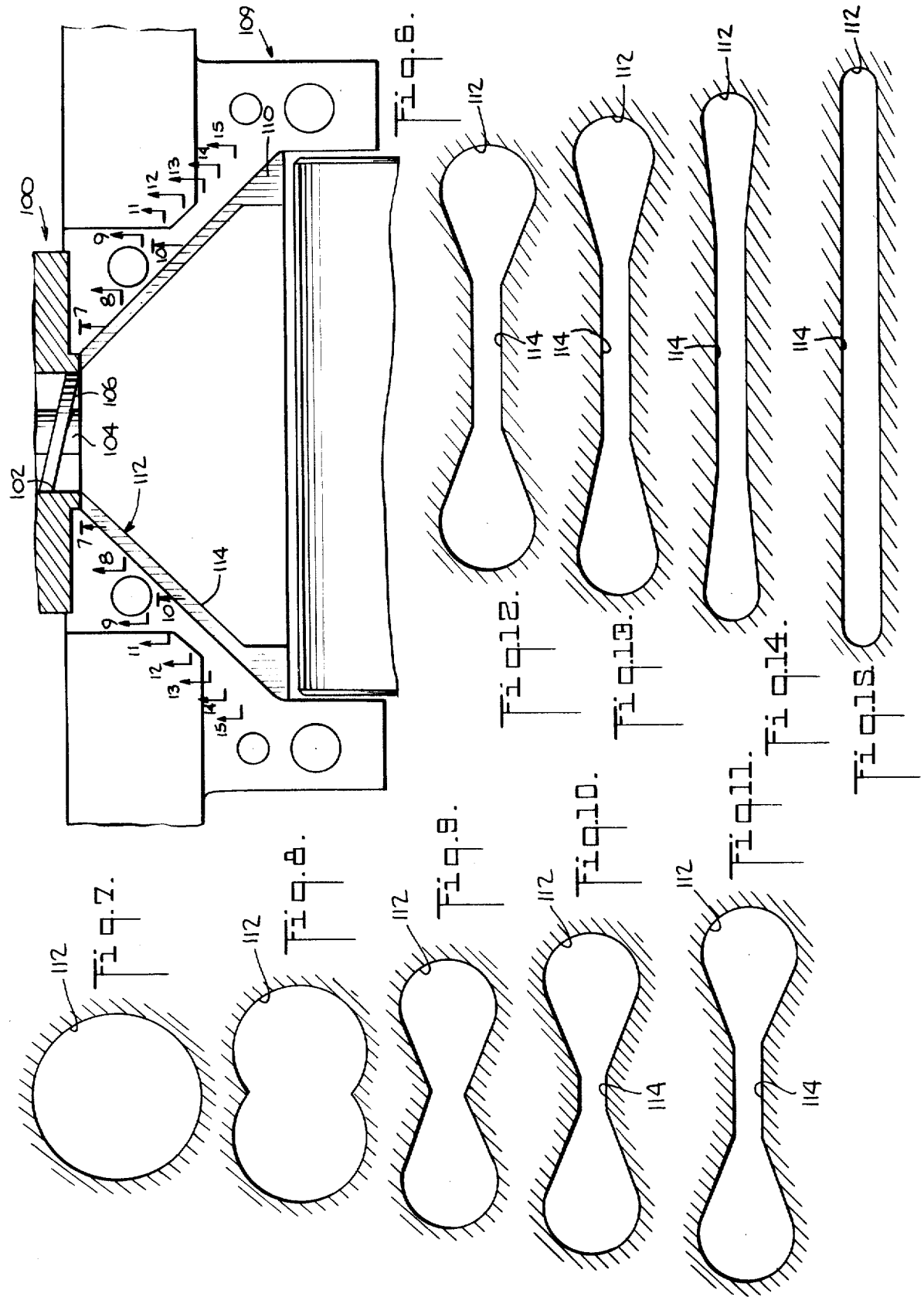

EXTRUDER AND ROLLER-DIE COMBINATION

BACKGROUND OF THE INVENTION

The present invention relates generally to an apparatus for forming a continuous elastomeric strip, such as in the nature of a tire tread slab, and more particularly to a method and apparatus in which there is utilized an assembly constituted primarily of a driven roller and a stationary die-blade confronting the roller and defining therewith a convergent nozzlelike chamber. The chamber operates on an elastomeric mass to convert the latter into a continuous elastomeric strip having "feathered" or extremely thin, longitudinally extending edges.

Conventional practices for shaping or otherwise fabricating elastomeric strips, in the form of tread slabs of rubber composition, for use in manufacturing pneumatic tires, have proven to be less than most desirable, this because the tread slab, at least in certain instances, is not reliably formed with coherent feathered edges in which the integrity thereof is sharply maintained. Feathered edges, as conventionally understood, are those opposed, longitudinal, elongate edges of the tread slab which are of extremely thin nature, and present a smooth transition between the sidewall and tread portions of a tire carcass to permit high quality stitching(adhesion) of the tread slab to the tire carcass.

Generally speaking, the tread slab, at least pursuant to one conventional mode of apparatus, is extruded under pressure through a slit-die, the latter being contoured to appropriately impart to the elastomeric material, of which the tread slab is constituted, a preferred cross-sectional contour. The disadvantage associated with the conventional slit-die assembly is that the pressure exerted against the elastomeric material, as the latter issues through the slit-die, is a limited function of the pressure developed by the extrusion assembly upstream of the slit-die. As a result, therefore, since the conventional extrusion apparatus, upstream of the slit-die, has a limited maximum capacity for developing pressure therein especially so as not to overplasticize the elastomeric mass, it cannot reliably impart to the elastomeric material the more preferable, coherent and generally blemish-free feathered edges.

In order to overcome the disadvantages associated with the conventional slit-die assembly, the slit-die, downstream of the extrusion unit, has been conventionally replaced, or otherwise substituted for, by a calendering assembly in which there are rovided a pair of opposing rolls or rollers, one of which is contoured and cooperates with an uncontoured, substantially cylindrical surface of the opposing roller or mate thereof for purposes of imparting to the elastomeric mass, as the latter is extruded to and through the nip area or clearance therebetween, a preferred cross-sectional appearance.

The calender rolls, downstream of the extruder, in an additive or supplemental manner, provide means for increasing the pressure to which the elastomeric mass is subjected as it is extruded through the nip area between the rollers. The pressure is increased from that pressure developed by the extrusion apparatus, to an added or supplemental pressure generated by the rollers as the latter are drivingly rotated in the direction of feed or extrusion of the elastomeric mass. Thus, the utilization of calender rolls downstream of conventional extrusion apparatus is somewhat more beneficial than merely utilizing the conventional slit-die assembly, this because the calender rolls themselves, when driven, introduce increased energy into the elastomeric mass as the latter passes through the nip area therebetween.

However, calendering rolls provide only a minimum effective surface area against which the elastomeric mass engages, the effective or working surface, area being respective segments of the opposing rolls, of minimal arcuate extent, which converge toward and thereafter diverge away from one another specifically at the nip area between the rolls. Thus, although calendar rolls permit the increasing of nip pressures such as by decreasing the clearance between the rolls, or by increasing the rate of rotation of the rolls, since the elastomeric mass is only subjected to the increased pressure over minimal arcuate working surface segments of the opposing rolls, the ultimate cross-sectional contour of the elastomeric product issuing from the nip will not necessarily and predictably have blemish-free, highly coherent, feathered edges to the extent that may be most desirable.

Another disadvantage associated with the utilization of calendering rolls, one which is of substantially cylindrical extent, or uncontoured, and the other contoured circumferentially to cooperate with the uncontoured roll, is that the contoured roll cannot be most effectively fabricated with a sharp profile, or effectively scraped and cleaned when necessary to present a sharp profile. Thus, the ultimate shape of the elastomeric product is often undesirably dependent upon the lack of a sharp profile in the contoured roll due to fabrication deficiencies or excess elastomeric stock caked upon, and not fully removed from, the roll. Moreover, the contoured roll is of considerable bulk and does not readily lend itself to be easily exchanged for another when necessary for altering the cross-sectional appearance of the elastomeric product.

Thus, despite the provision of calendering rolls downstream of an extrusion assembly for enhancing the degree of pressure to which the elastomeric mass is to be subjected, this being a significant improvement over the conventional slit-die assembly, there still remains serious disadvantages associated with the use of calendering rolls in conjunction with extrusion apparatus.

SUMMARY OF THE INVENTION

Accordingly, it is a principal object of the present invention to provide a new and improved extrusion die-calendering apparatus and method in which not only can the pressure, to which the elastomeric mass is subjected, be significantly increased, but the duration, or preservation, of time in which the elastomeric mass is subjected to the increased pressure will be likewise significantly increased to permit the formation or shaping of an elastomeric product, in the nature of a tread slab for pneumatic tires, which will present coherent feathered edges of high integrity.

It is another object of the present invention to provide an assembly in which the principle of two-roll calendering is utilized in part, in that one roll is retained while the second contoured roll is replaced by a less bulky, readily changeable, stationary, contoured die-blade which can be more accurately fabricated with a sharp profile than can be the contoured roll.

It is still a further object of the present invention to reduce the extent of swelling normally attributable to an elastomeric product after the product has been discharged from an extrusion-shaping assembly. In this respect, the development of internal stresses within the elastomeric product, during formation thereof, is more accurately controllable by the present invention, this also permitting the formation of a strip having, in cross-section, adjacent thick and thin segments, namely thick segment separated from one another through the intermediary of a thin connecting web.

It is still another object of the present invention to provide extrusion die-calendering apparatus in which the extrusion speed can be varied (increased) without affecting the integrity or coherency of the ultimate feathered edges formed on the product.

It is a further object of the present invention to permit the utilization of perform or secondary dies upstream of the main die such as for purposes of adjusting or controlling the quantity of elastomeric mass fed to the main die.

It is still another object of the present invention to provide an assembly for shaping an elastomeric mass in which the fabrication tolerances can be maintained within a few thousandths of an inch.

To this end, the present invention relates to a method and apparatus for forming a continuous elastomeric strip, such as a tire tread slab for pneumatic tires, the apparatus comprising a driven roller, a stationary die-blade which confronts and converges toward an arcuate segment of the roller, the die-blade and roller cooperatively defining a pressure chamber therebetween terminating in a narrow restriction orifice, and means such as an extruder for introducing the elastomeric mass under pressure into the chamber and upon the roller. The chamber gradually reduces the cross-sectional thickness of the elastomeric mass and preforms the latter, whereas the restriction orifice, under increased pressure, imparts to the elastomeric mass a final cross-sectional appearance.

BRIEF DESCRIPTION OF THE DRAWINGS

The above and additional objects and advantages of this invention will be more clearly understood from the following detailed description thereof when read in conjunction with the accompanying drawings in which:

FIG. 3 is a fragmentary, partly cross-sectional, end elevation view on a reduced scale taken along the line 3—3 in FIG. 2;

FIG. 6 is a fragmentary cross-sectional view taken along the line 6—6 in FIG. 4;

FIGS. 7–15 are enlarged schematic representations illustrating the downstream change in peripheral contour of a transition pressure chamber employed in the first embodiment, the views being taken along respective lines 7—7 through 15—15 in FIGS. 2 and 6;

DETAILED DESCRIPTION OF THE INVENTION

Figure 1:
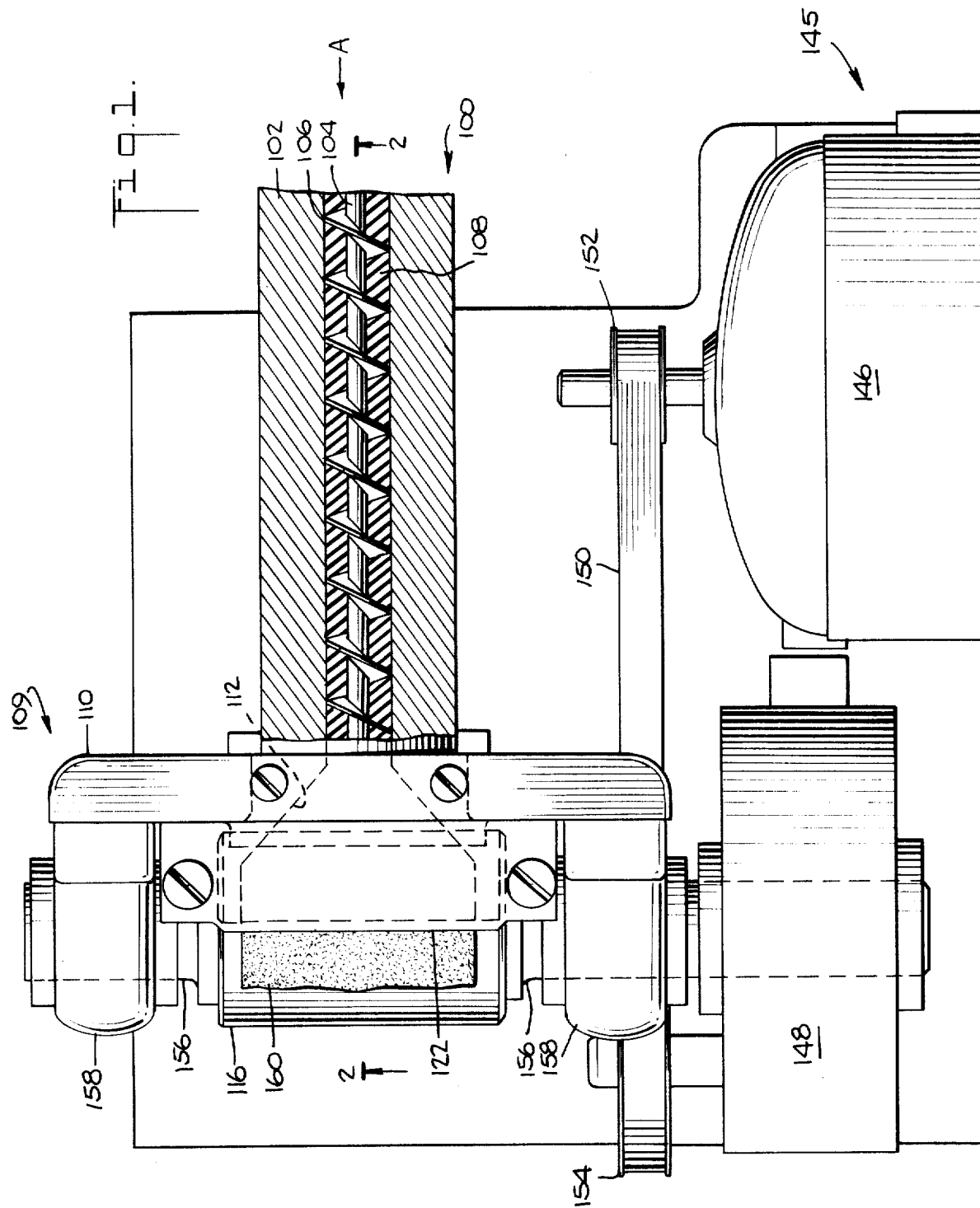
FIG. 1 is a fragmentary, schematic plan view, partly in cross-section, illustrating structure pursuant to a first embodiment of the present invention.

Referring now to the drawings and more particularly to FIGS. 1–16, which relate to the first embodiment of the present invention, FIG. 1 is schematic plan view illustrating apparatus pursuant to the present invention. The apparatus employs an extruder assembly denoted generally by the reference character 100. The extruder assembly 100 includes an extrusion barrel 102 in which, in a conventional manner, is rotatably disposed an extrusion screw 104 having a helical thread flight 106. The extrusion screw 104, upon rotating, acts to extrude and feed an elastomeric mass 108 in the direction of arrow A toward a die-roller calendering unit, shown generally at 109, which includes an extrusion die-head 110. The elastomeric mass 108 may be a natural or synthetic rubber, a blend of natural and synthetic rubbers, a synthetic elastomeric resin, combinations of natural rubber and synthetic resins, or any other suitable composition generally utilized in the manufacture of elastomeric articles such as tread slabs for pneumatic tires, and the like.

Figure 2:
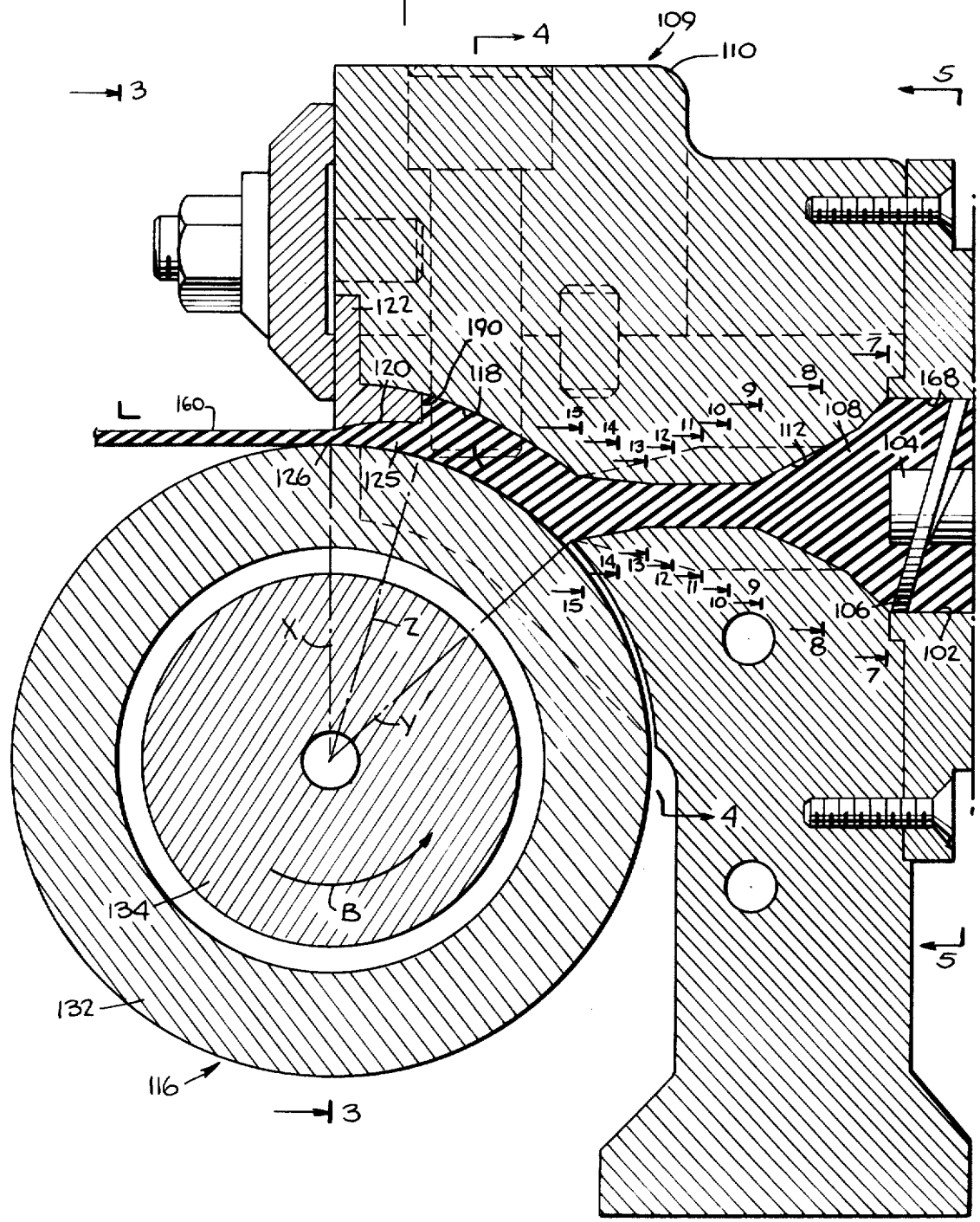
FIG. 2 is a fragmentary, side elevation, cross-sectional view, on enlarged scale, of the principal structure of the first embodiment taken along line 2—2 in FIG. 1.
Figure 9:
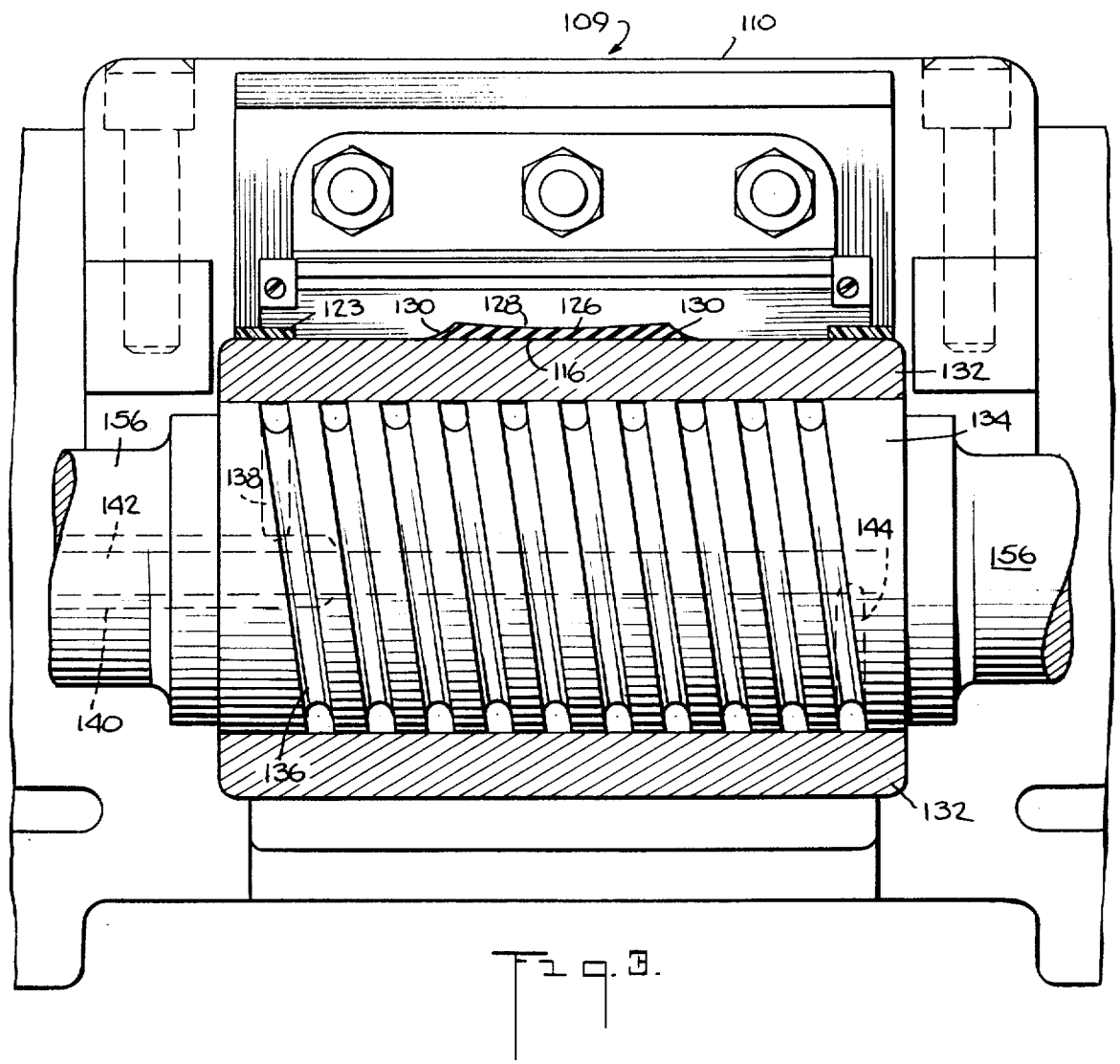

The extrusion screw 104 acts to feed the elastomeric mass 108 toward a transition pressure chamber 112 which widens laterally, or in a horizontal plane, as illustrated in FIG. 1, and narrows in a vertical plane, as illustrated in FIG. 2. The transition pressure chamber 112 is provided with an elongate trunk portion 114 which communicates with an arcuate segment of a roller 116, the arcuate segment of the roller 116 being generally defined as that segment between the imaginary radial lines X and Y denoted in FIG. 2. The roller 116 is provided with an uncontoured substantially cylindrical surface, the roller 116 being appropriately supported, as will be clarified below, in proximity to the extrusion die-head 110.

The extrusion die-head 110, immediately downstream of the elongate trunk portion 114 of the transition pressure chamber 112, is provided with a stationary, contoured, arcuate or curvilinear, secondary die segment guide-surface 118 which confronts, and is coextensive with, the roller 116 between the imaginary radial lines Y and Z denoted in FIG. 2. Immediately downstream of the secondary die segment guide-surface 118, there is provided a stationary, contoured, arcuate or curvilinear, primary die segment guide-surface 120 which tapers or converges toward the roller 116 and confronts the latter, coextensively, between the imaginary radial lines X and Z denoted in FIG. 2. The primary die segment guide-surface 120 is formed as part of a vertically adjustable die-blade 122, the die-blade 122 being vertically adjustable, by conventional means (not shown), to permit adjustment of the clearance between the roller 116 and the primary die segment guide-surface 120.

The die-blade 122 is provided with a pair of stationary, low-friction, bearing members 123, as illustrated in FIG. 3, which directly engage the roller 116 yet permit generally unrestrained rotation of the latter. The primary die segment guide-surface 120, in cooperation with the arcuate segment of the roller 116 between the imaginary radial lines X and Z, acts to define a nozzle-like, horn or wedge shaped pressure chamber 125 through which the elastomeric mass 108 passes under progressively increasing pressure, and from which the elastomeric mass 108 emerges in a compressed condition.

As indicated above, and illustrated generally in FIG. 3, the primary die segment guide-surface 120 of the die-blade 122 is contoured and defines cooperatively with the roller 116, a narrow restriction orifice 126, the primary die segment guide-surface 120 being laterally contoured axially of the roller 116 and presenting a contoured medial segment 128 and a pair of contoured side wall segments 130 separated from one another through the intermediary of the medial segment 128.

The roller 116 constitutes an axially uncontoured, remaining portion of the narrow restriction orifice 126, the uncontoured portion beinf formed as part of the outermost periphery of an outer annular segment 132 of the roller 116. The outer annular segment 132 is fixedly mounted upon, and rotatable with, an inner helically threaded segment 134 of the roller 116. The outer surface of the helically threaded segment 134 and the inner surface of the annular segment 132 cooperate to provide a helically extending coolant channel 136 through which a coolant, such as cooling water and the like, may flow. The coolant may be fed thereto via a radial passageway 138 and an annular coolant feed chamber 140 which surrounds an inner coolant return chamber 142, the return chamber 142 communicating directly with a second, terminal, radial passageway 144 of the coolant channel 136 to provide means through which the coolant may egress from the roller vicinity.

Referring once again to FIG. 1, the roller 116 is rotatably driven in the direction of arrow B (FIG. 2) or in the general direction of feed of the elastomeric mass 108 by drive means shown generally at 145. The drive means 145 includes a variable speed motor 146 which cooperates with a reduction gearing assembly 148 through the intermediary of an endless belt 150 mounted upon both a driver pulley 152 and a driven pulley 154, the driver pulley being mounted upon the motor assembly 146 and driven pulley upon the gearing assembly 148. The roller 116 is provided with an axle unit 156 appropriately journalled in support bearings 158, one end of the axle unit 156 being suitably driven by the reduction gearing assembly 148. The drive means 145 provides for suitable control of the peripheral speed or rotational rate of the roller 116.

Figure 16:
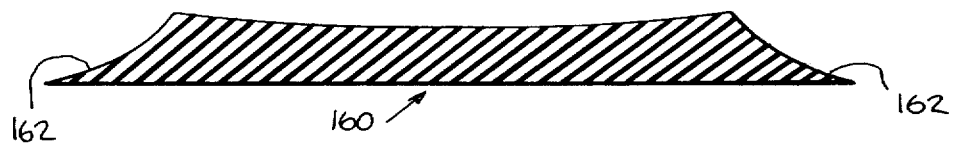
FIG. 16 is a fragmentary cross-sectional view of the ultimate elastomeric product formed by the first embodiment of the present invention.

The driven roller 116 cooperates with the die-blade 122 to define both the wedge-shaped pressure chamber 125 and the narrow restriction orifice 126 at which the wedge-shaped pressure chamber 125 terminates. As the elastomeric mass 108 is discharged from the narrow restriction orifice 126 it is imparted with a cross-sectional appearance in the nature of a strip or tire tread slab, as illustrated in FIG. 16 and denoted generally by the reference character 160, the tread slab or strip 160 having feathered edges 162 which are of extremely narrow extent. The feathered edges 162 are of knife-like nature and have a generally unblemished surface-finish conforming extremely closely to that of the contour of the contoured side wall segments 130 of the die-blade 122.

The die-blade 122 may be readily exchanged for purposes of cleaning and the like and replaced immediately by a substitute die, this becuase of the rather low bulk nature of the die-blade 122, as compared to the high bulk of a conventional contoured roller, the substitution and cleaning of the die-blade 122 enhancing the degree of control over the quality of the feathered edges 162 of the strip 160 as the latter is discharged from the narrow restriction orifice 126.

Figure 5:
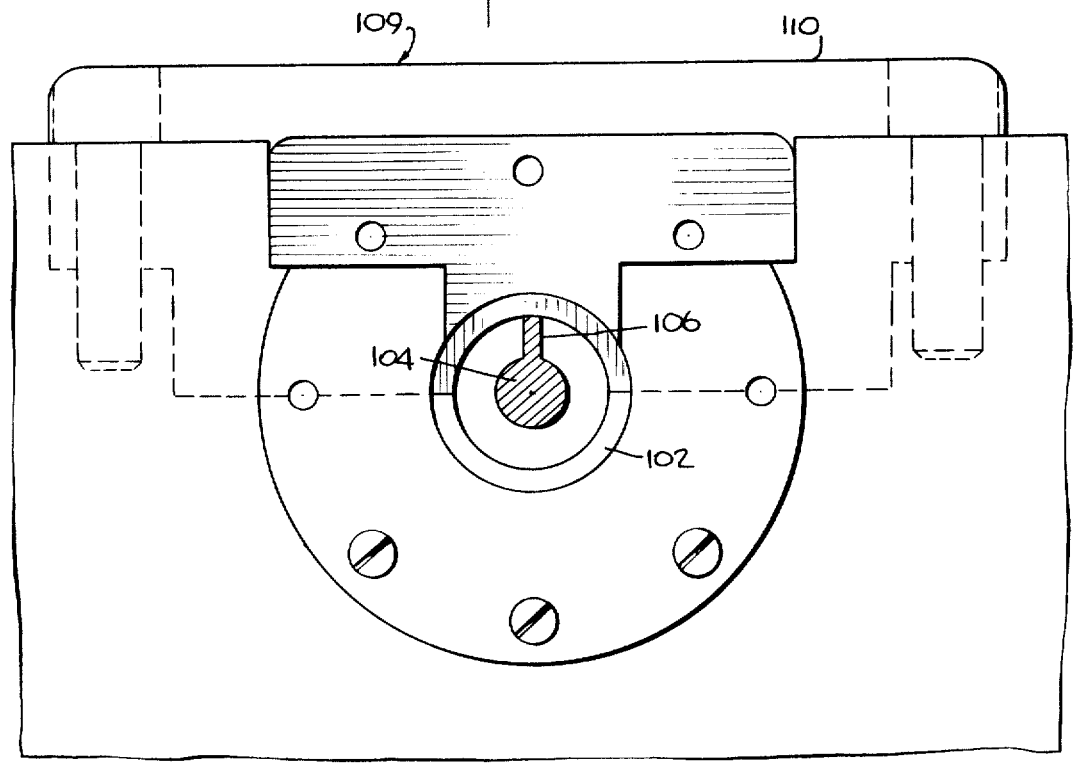
FIG. 5 is a fragmentary, partially cross-section view, on a reduced scale, taken along the line 5—5 in FIG. 2.

The exit end 168 of extrusion barrel 102 is circular in cross-section, as shown in FIG. 5. Accordingly, in operation the helical thread flight 106 of the extrusion screw 104 causes the elastomeric stock 108 to be discharged from the extrusion barrel 102 in cylindrical form. The extrusion screw 104 and barrel 102 cooperatively generate a pressure which is imparted to the elastomeric mass 108 as the latter is processed through the barrel 102, out of the exit end 168 of the barrel and into the confines of the transition pressure chamber 112. As discussed above, the transition pressure chamber 112 widens laterally or in a horizontal plane, the elongate trunk portion 114 of the transition pressure chamber 112 likewise widening in a horizontal plane, the transition pressure chamber 112 and elongate trunk portion 114 both being contoured in a manner successively illustrated in FIGS. 7–15. In this respect, that portion of the transition pressure chamber 112 which narrows in a vertical plane, as illustrated in FIG. 2, is provided with a successively changing contour illustrated in FIGS. 7–9, by which the elastomeric mass 108 is converted from a generally cylindrical or circular appearance to that of a generally twin-paddled appearance.

Thereafter, the elongate trunk portion 114 of the transition pressure chamber 112 commences, as shown in FIG. 10. Trunk portion 114 changes and increases in lateral expansion from the configuration illustrated in FIG. 10 to the configuration illustrated in FIG. 15, this through the intermediary of a gradual change in contour illustrated in FIGS. 11–14. FIGS. 10–14 indicate that the elastomeric mass is converted from the generally twin-paddled appearance illustrated in FIG. 9 to that of an increasingly elongated dumb-bell shape configuration illustrated in FIG. 14. The elastomeric mass 108 is ultimately formed into a flat slab having a configuration illustrated in FIG. 15, and is thereafter fed onto the roller 116.

The relationship of FIGS. 7–15 is correlated generally with the respective imaginary lines 7—7 through 15—15 illustrated both in FIGS. 2 and 6, FIG. 2 illustrating the vertical change in contour of the transition pressure chamber 112 and FIG. 6 illustrating the horizontal change in contour of the chamber 112. Thus, the elastomeric mass 108 is converted from the cylindrical or circular cross-sectional configuration illustrated in FIG. 7, immediately downstream of the extrusion barrel 102, to a low, wide cross-sectional configuration illustrated in FIG. 15, at the end of the elongate trunk portion 114, and is thereafter fed onto the driven roller 116.

Figure 4:
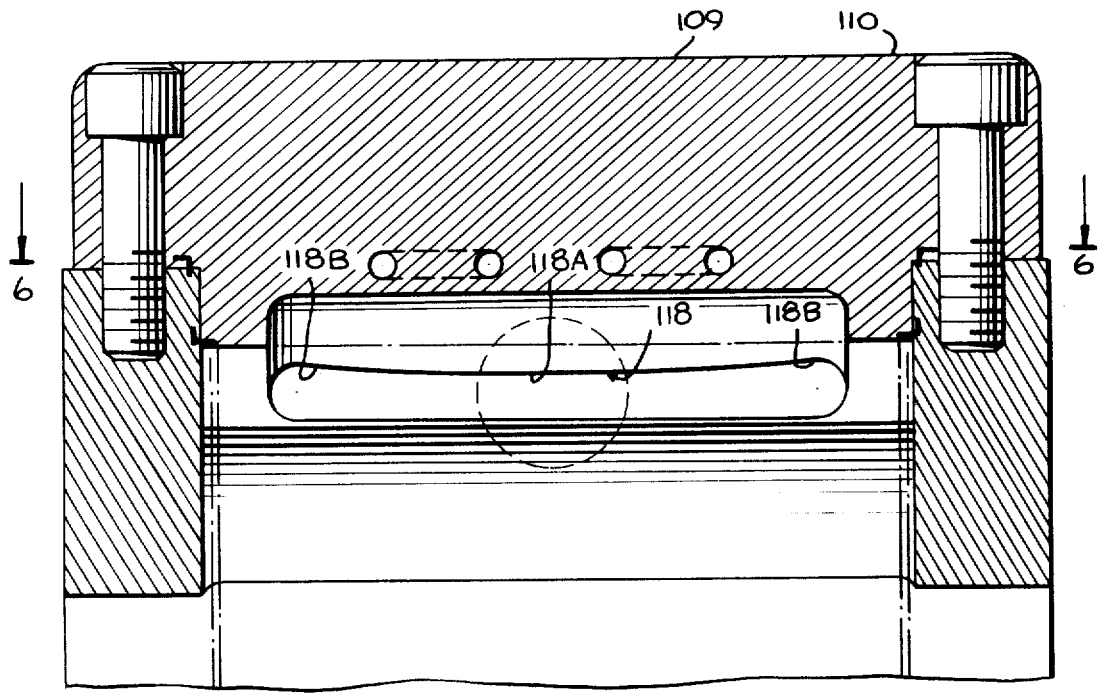
FIG. 4 is a fragmentary cross-sectional view, on a reduced scale, taken along the line 4—4 in FIG. 2.

The secondary die segment guide-surface 118 (FIG. 2) is arcuate in nature, generally circumferentially of the roller 116 and is laterally contoured in a manner illustrated in FIG. 4. The secondary die segment guide-surface 118 is so contoured as to provide a low intermediate portion 118A and higher end portions 118B, respectively. The intermediate portion 118A is closer to the roller 116 than the end portions 118B and causes the elastomeric mass 108, having the configuration illustrated in FIG. 15, to be squeezed vertically at the intermediate portion 118A and laterally outwardly to the end portions 118B. This ensures that the elastomeric mass 108 is uniformly distributed into the confines of the wedging pressure chamber 125 defined by the primary die segment guide-surface 120 and the peripheral surface of the roller 116.

The roller 116, as it is rotatably driven by the drive means 145, acts to impart energy into the elastomeric mass 108 and thereby increase the pressure initially imparted to the latter, by the extrusion screw 106 and extrusion barrel 102, in an additive or supplemental manner. The roller 116 and primary die segment guide-surface 120 thus function in a manner similar to that of a calendering apparatus and add significantly to the overall pressure to which the elastomeric mass 108 is subjected as the latter passes through the wedge-shaped pressure chamber 125. The overall or combined pressure developed by the extruder assembly 100 and the die-roller calendering unit 109, ensures that the elastomeric mass 108 will properly, and under significant pressure, flow uniformly through the narrow restriction orifice. Thus, the issuing product will be provided with the coherent feathered edges 162 of extremely high integrity in which there is substantially, if not entirely, absent from the surface of the strip or product 160 blemishes, serrations or other surface imperfections which otherwise, if present may reduce the stitching quality of the tread slab to a tire carcass (not shown).

In this respect, a significant feature of the present invention is the arcuate nature of the primary die segment guide-surface 120 which circumferentially of the roller 116, as viewed in FIG. 2, presents a concavity confronting and converging toward the roller 116. The concavity of the surface 120 in conjunction with the convexity of the segment of the roller 116, between the imaginary radial lines X and Z, define the elongate, low-angle wedge-shaped pressure chamber 125 through which the elastomeric mass 108 passes under pressure. The elastomeric mass moves into progressively increasing pressurized contact with the contoured surface of the primary die segment guide-surface 120 as it proceeds through the chamber 125 from the imaginary radial line Z. The contoured surface herein refers to the lateral extent of the chamber 125 axially of the roller 116 which initiates, preferably, at the rear face or sruface-discontinuity 190 (FIG. 2) of the die-blade 122 and terminates at the restriction orifice 126. Because of the concave nature of the surface 120 (as viewed in FIG. 2), circumferentially of the roller 116, this surface is in substantially greater proximity with the roller 116 than would be the convex surface of an opposing roller mate for the roller 116 (had roller 116 been provided as part of a conventional two-roll calendering assembly in which the mate is of similar outer diameter). The chamber 125 may, therefore, be characterized as an elongate convergent nip, through which the elastomeric mass passes, having an effective working surface extent which is substantially greater than that of the nip between opposing similar outerdiameter rollers of a conventional two-roll calendering assembly.

Pursuant to a principal concept of the present invention, it is contemplated that the surface 120 be also non-curvilinear, or of straight line character, having a substantially infinite radius of curvature, so that the portion of the surface 120 at the orifice 126 of the die-blade 122 is still in substantially greater proximity to the roller 116 than the remaining portions thereof, and so that there still remains an elongate, wedge-shaped pressure chamber or nip having an effective working surface extent greater than that of a conventional opposing-roller assembly.

In either instance, the elastomeric mass 108 is treated (shaped) for a longer period of time and over a longer effective working nip extent than conventional opposing-roller calendering assemblies can provide, and, thus, coherent and blemish-free feathered edges are more reliably and effectively formed. Moreover, the thickness of the ultimate product formed is controllable because of the vertically adjustable nature of the die-blade 122.

Accordingly, the method of the present invention, utilizing principally the first embodiment illustrated generally by the FIGS. 1–15, relates to shaping or otherwise forming an elastomeric strip, such as that of the strip 160, by feeding or extruding an elastomeric mass under pressure between mutually confronting stationary and movable surfaces which cooperatively define an elongate pressure chamber. The stationary surface in this instance refers, preferably, to that of the primary and secondary die segment guide-surfaces 120 and 118 respectively. The movable surface refers, preferably, to the rotatable roller 116, and the elongate pressure chamber refers, preferably, to the wedging pressure chamber 125. Thereafter, the cross-sectional thickness of the elastomeric mass is significantly reduced, thinned or otherwise narrowed under increased pressure as it passes through a narrow restriction orifice, namely the restriction orifice 126 at the end of the wedge-shaped pressure chamber 125.

Figure 17:
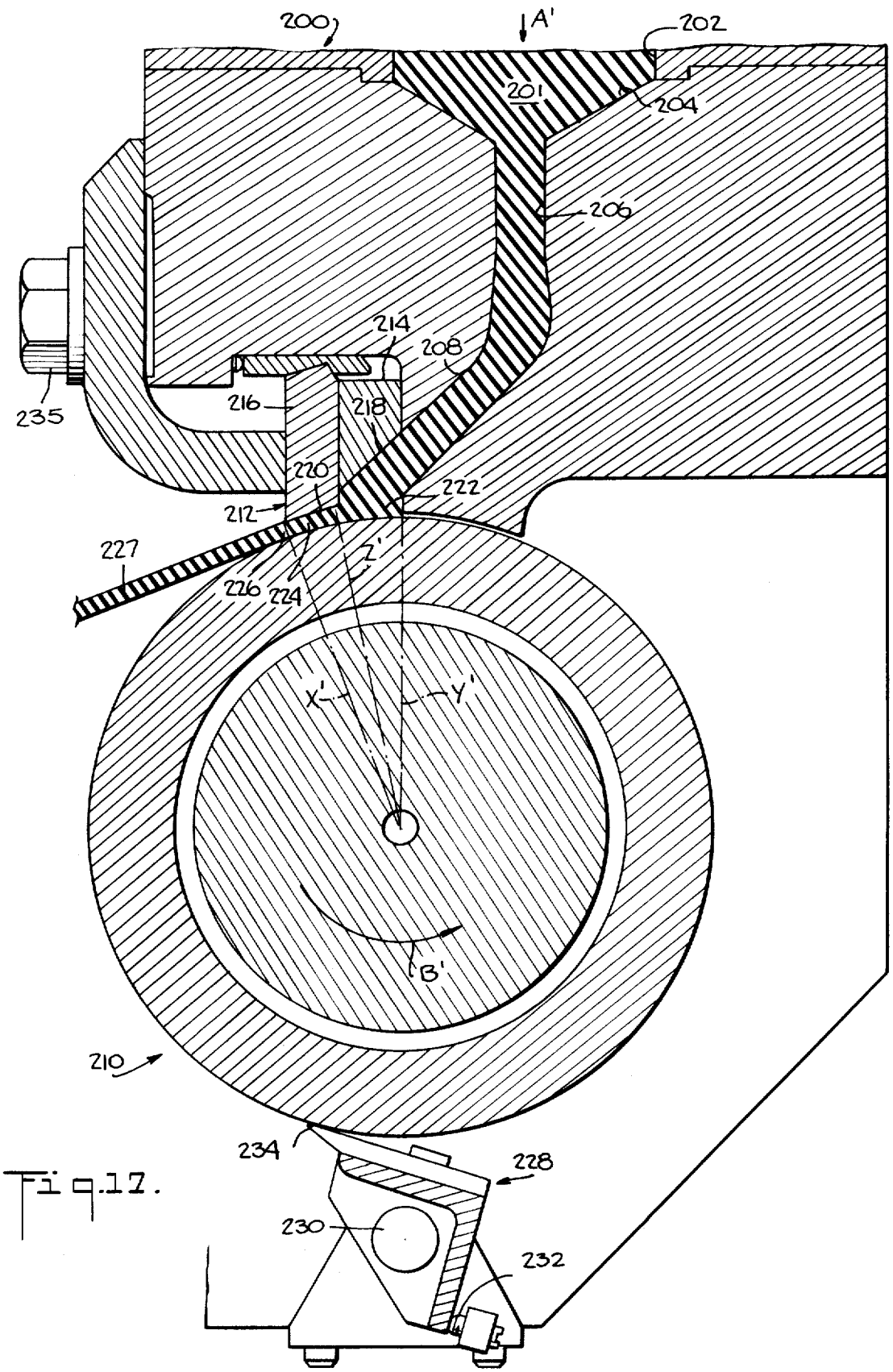
FIG. 17 is a view similar to that of FIG. 2, but illustrating a second embodiment of the present invention.
Figure 18:
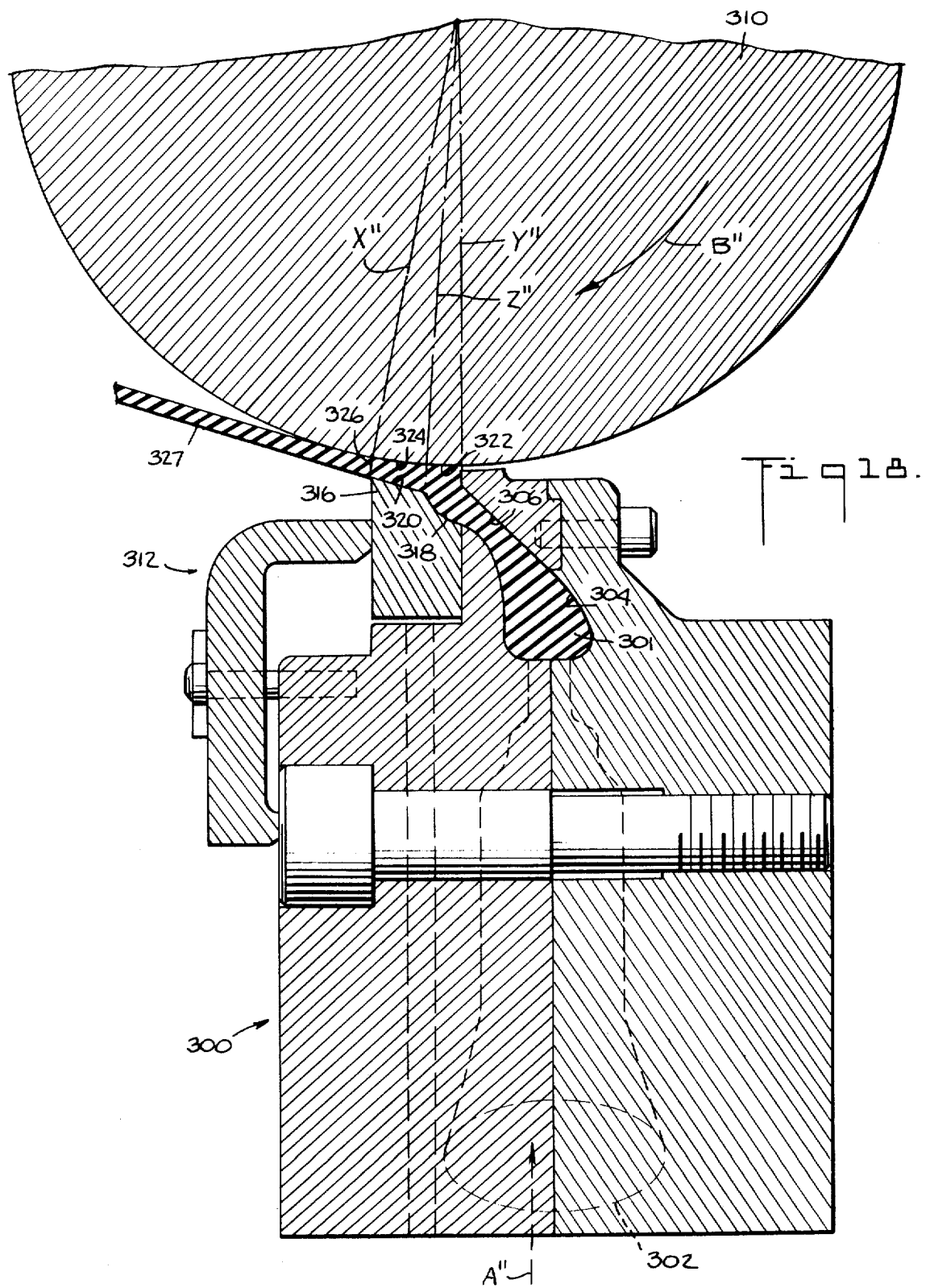
FIG. 18 is a view similar to that of FIG. 2, but illustrating a third embodiment of the present invention.
Figure 19:
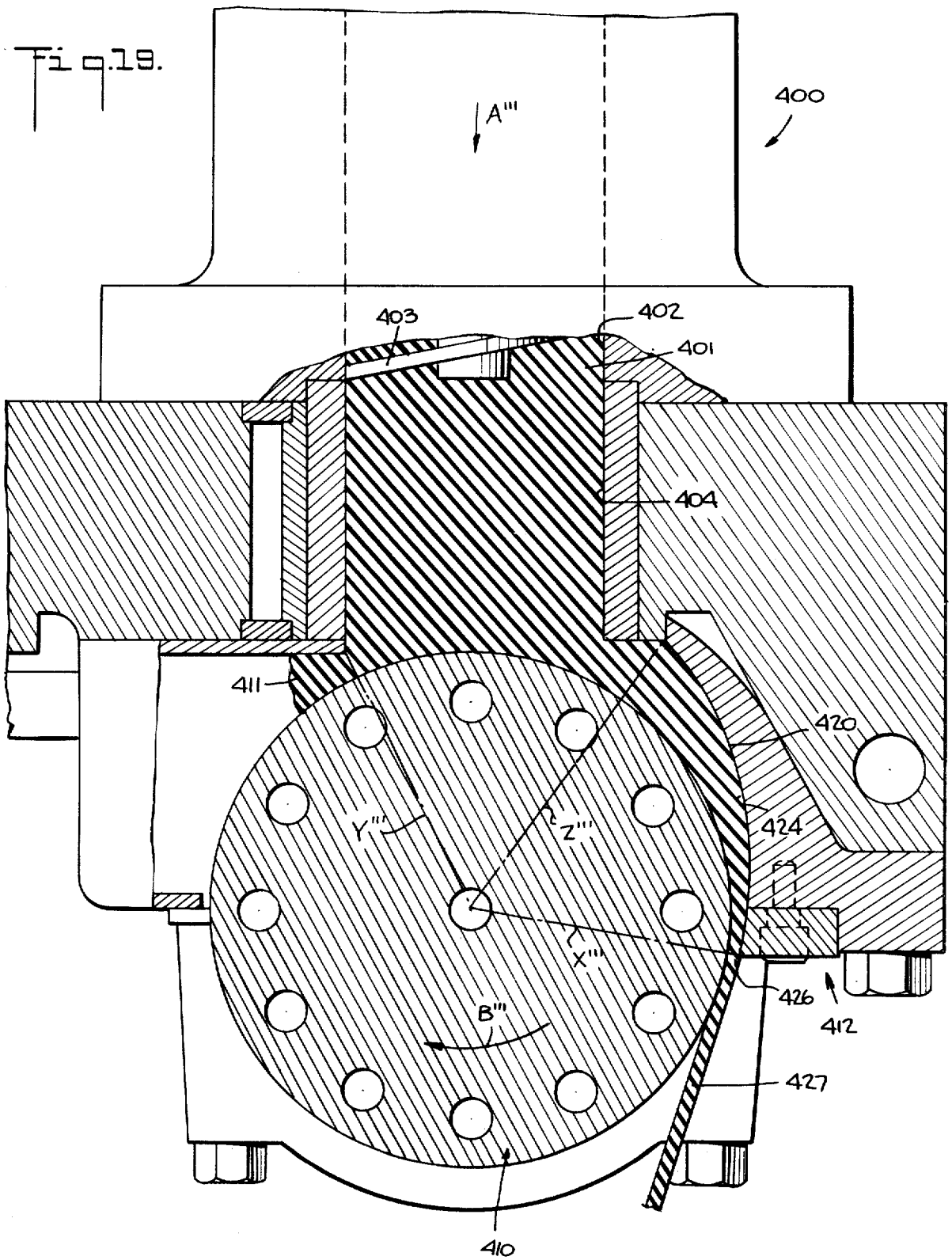
FIG. 19 is a view similar to that of FIG. 2, but illustrating a fourth embodiment of the present invention.

The method generally employs the driving of the roller 116 to supplement or add to the initial pressure to which the elastomeric mass 108 is subjected by the extrusion screw 104 and the extrusion barrel 102, the roller 116 being driven at a rate significantly greater than the rate at which the elastomeric mass 108 is extruded thereupon, this to frictionally carry and thereby wedge an increased quantity of the elastomeric mass 108 into and through the wedge-shaped pressure chamber 125, to increase the energy introduced into the elastomeric mass 108, and thereby increase the pressure to which the mass 108 is subjected. FIGS. 17–19 illustrate second, third and fourth embodiments, respectively, of the apparatus pursuant to the present invention by which the method of the present invention, as discussed above, may be also achieved. The nature of the apparatus of the second, third and fourth embodiments is described below.

In this respect, referring now to FIG. 17, the second embodiment is denoted generally by reference character 200 and utilizes an extrusion head into which an elastomeric mass 201 is extruded by means of an extusion barrel 202 and an extrusion screw (not shown), the elastomeric mass 201 being extruded or fed in the direction of arrow A' into a transition pressure chamber 204. The transition pressure chamber 204 narrows in the plane of FIG. 17, yet widens in a plane transverse of the plane of FIG. 17, in a manner generally described above for the transition pressure chamber 112 in the first embodiment of FIGS. 1–15. The transition pressure chamber 204 is provided with a pair of elongate trunk segments 206 and 208, respectively, which are inclined with one another and communicate with a driven roller 210, the roller 210 being driven in the direction of arrow B', the segment of the roller 210 with which the elongate trunk segment 208 communicates being defined by the imaginary radial lines X' and Y'.

Directly above the roller 210, there is provided a shaping die-blade assembly 212 having both a preshaping die-blade 214 and a final shaping die-blade 216, each confronting the roller 210. The pre-shaping die-blade 214 is provided with a stationary secondary die segment guide-surface 218 which is generally flat, circumferentially of the roller 210, and contoured axially of the roller 210. The secondary die segment guide-surface 218 confronts the roller 210 between the imaginary radial lines Y' and Z'. On the other hand, the final shaping die-blade 216 is provided with a primary die segment guide-surface 220 of stationary nature which is arcuate circumferentially of the roller 210 and presents a concavity which directly and coextensively confronts the roller 210 between the imaginary radial lines X' and Z'. Both the final shaping die-blade 216 and the preshaping die-blade 214 are spaced proximate the roller 210, the secondary die segment guide-surface 218 defining with the roller 210 a secondary wedge-shaped pressure chamber 222, whereas the primary die segment guide-surface 220 cooperatively defines with the roller 210 a primary wedge-shaped pressure chamber 224.

The primary wedge-shaped pressure chamber 224 terminates in a narrow restriction orifice 226 having a configuration similar to that of the restriction orifice 126 denoted in FIG. 3 for the aforementioned first embodiment. The elastomeric mass 201 is discharged through orifice 226 in the form of a strip, in the nature of a tire tread slab, having a configuration similar to that of the strip 160 denoted in FIG. 16 for the first embodiment.

Accordingly, in operation, the elastomeric mass 201 is processed through the extrusion barrel 202, into the transition pressure chamber 204 and through both of the elongate trunk segments 206 and 208 respectively. While the elastomeric mass 201 passes under pressure from the extrusion barrel 202, through the transition pressure chamber 204, and through both of the elongate trunk segments 206 and 208, the elastomeric mass 201 changes in cross-sectional configuration in a manner similar to that of the change in cross-sectional configuration that the elastomeric mass 108 undergoes in the first embodiment of this invention, as is illustrated in FIGS. 7–15.

Thereafter, the elastomeric mass 201 is fed onto the roller 210 and undergoes a pre-shaping stage wherein it is ultimately passed through the primary wedge-shaped pressure chamber 224 and discharged from the restriction orifice 226 in the form of the strip 227. The roller 210, driven in a manner similar to that of the roller 116 for the embodiment of FIGS. 1–15, acts to impart energy into the elastomeric mass 201 to thereby, in an additive or supplemental manner, increase the overall pressure to which the elastomeric mass 201 is subjected. The resultant pressure is that pressure initiated in the extrusion barrel 202 and the pressure developed by the driven roller 210, the latter being driven at a rate preferably somewhat greater than the rate at which the elastomeric mass 201 is fed thereupon.

In order to permit cleaning of the roller 210, there is provided a roller cleaning-blade 228 which is journalled upon a pivot pin 230 and provided with a threadedly adjustable screw 232 for tilting the knife edge 234 into engagement with the substantially cylindrical surface of the roller 210. The knife edge 234 acts to wipe, scrape or otherwise remove any of the elastomeric mass 201 which tends to build or cake upon the peripheral surface of the roller 210. This ensures that the elastomeric mass 201 will be provided, at least along the underside thereof, with a well defined contour conforming strictly to that contour of the restriction orifice 226 without blemishes or other surface imperfections.

The shaping die-blade assembly 212 is vertically adjustable to provide means for controlling the clearance between the primary and secondary die segment guide-surface 220 and 218, respectively, relative to the peripheral surface of the roller 210. Vertical adjustment is permitted as the shaping die blade assembly 212 is provided with a vertically elongate slot (not shown) or the like surrounding a die-holding bolt assembly 235. Moreover, the entire shaping die-blade assembly 212 may be readily and easily exchanged for that of a substitute assembly to permit cleaning of the original assembly. This further ensures that the ultimate product or fabricated strip 227 is formed with highly coherent feathered edges which are blemish or otherwise surface-imperfection free.

The third embodiment of the apparatus pursuant to the present invention is illustrated in FIG. 18 and denoted generally by the reference character 300. In this instance the elastomeric mass 301 is extruded or fed in the direction of arrow A" through a "cross-head" type of extrusion barrel 302 (as opposed to the "in-line" type of the previous embodiments) and into a transition chamber 304 having an elongate trunk segment 306. During this stage the elastomeric mass 301 undergoes narrowing generally in the plane of FIG. 18 and a widening in a plane generally transversely of the plane of FIG. 18 to be converted from a generally cylindrical cross-sectional configuration to that of a flat cross-sectional configuration in a manner similar to that of the change in cross-sectional appearance that the elastomeric mass 108 undergoes in the first embodiment, as illustrated in FIGS. 7–15.

The elastomeric mass 301 is then fed onto a roller 301 which is driven in the direction of arrow B" where it is subjected to the effects of a shaping die-blade 312, the shaping die-blade assembly 312 having a shaping die-blade 316 formed with both a secondary die segment guide-surface 318 and a primary die segment die surface 320. Each of the secondary and primary die segment guide-surfaces 318 and 320, respectively, is provided with a concavity circumferentially of the roller 310, which concavities confront the latter. The concavity of the secondary die segment guide-surface 318 is of deepened nature and confronts the roller 310 between the imaginary radial lines Y" and Z", whereas the concavity of the primary guide segment guide-surface 320 is shallow and confronts the roller 310 between the imaginary radial lines X" and Z".

Both of the guide surfaces 318 and 320 cooperate with the roller 310 for defining, respectively, a secondary wedge-shaped pressure chamber 322 and a primary wedge-shaped pressure chamber 324, the latter terminating in a restriction orifice 326. The elastomeric mass 301 is passed successively through the chambers 322 and 324, and is discharged through the restriction orifice 326 in the form of a strip or product 327 having a peripheral or cross-sectional contour similar to that of the strip illustrated in FIG. 16.

In this instance likewise the shaping die-blade assembly 312 and the roller 310 represent an assembly in the nature of a calendering unit which is downstream of the extrusion barrel 302. This assembly, in an additive or supplemental manner increases the overall pressure to which the elastomeric mass 301 is subjected in order to ensure that the product or strip 327 will be provided with coherent feathered edges of high integrity.

Referring now to FIG. 19, a fourth embodiment of the apparatus pursuant to the present invention is illustrated. The embodiment in this instance is denoted generally by the reference character 400 and is utilized for extruding an elastomeric mass 401 in the direction of arrow A''' from an extrusion barrel 402, such as by means of an extrusion screw 403, into and through a transition pressure chamber 404 and onto a roller 410 driven in the direction of arrow B'''. The elastomeric mass 401 has a portion 411 which contacts the roller 410 in an unrestricted manner, the rotation of the roller 410 in the direction of arrow B''' preventing the portion 411 of the mass 401 from enlarging beyond control and loosening from the periphery of the roller 410. The transition pressure chamber 404 in this instance is generally cylindrical, concentric with the interior of the extrusion barrel 402 and communicates directly with the roller 410 between the imaginary radial lines Y''' and Z'''.

In this instance, there is provided a shaping die-blade 412 having an extensive arcuate stationary die segment guide-surface 420 which coextensively confronts the roller 410 between the imaginary radial lines Z''' and X'''. As in the instances of the first, second and third embodiments discussed above, the die segment guide-surface 420 converges, with increasing proximity, toward the roller to define with the latter a wedge-shaped pressure chamber 424 terminating in a restriction orifice 426. The elastomeric mass 401 passes through the chamber 424 and is discharged through the narrow restriction orifice 426 in the form of a product or strip 427 having a peripheral cross-section similar to that of the cross-section illustrated for the stip in FIG. 16.

In this embodiment likewise, the wedge-shaped pressure chamber 424 is defined by both the stationary die segment guide-surface 420 and the roller 410, and, in an additive or supplemental manner, it increases the overall pressure to which the elastomeric mass 401 is subjected, the resultant pressure being that pressure initially imparted to the mass 401 simply by the extrusion apparatus alone, and also the pressure as developed by the roller 410 as the latter is deiven at a rate somewhat greater than the rate at which the elastomeric mass 401 is fed thereupon. Thus, the overall energy imparted to the elastomeric mass 401 is increased and this ensures that, as the elastomeric mass 401 is discharged through the restriction orifice 426, the ultimate product or strip 427 will be provided with a highly coherent feathered edge array in which there is absent blemishes or other surface imperfections.

Accordingly, although each of the embodiments differs slightly from one another with regard to the elongate extent, and degree of convergence, of the respective pressure chambers defined by the mutually confronting movable and stationary surfaces, each and every one of the structural embodiments of the present invention permits means for practising the method discussed above in which the elastomeric mass is fed between the mutually confronting coextensive stationary and movable surfaces having increased effective, working nip extents which cooperatively define the elongate, convergent, horn-like, pressure chamber. The elastomeric mass is finally narrow in cross-section when discharged through a narrow restriction orifice at the end of the pressure chambers, the latter not only adding to the extent of pressure to which the mass is subjected, but also increasing the period of time in which the mass is subjected to the increased pressure. This ensures the formation of extremely thin coherent feathered edges from which there is absent blemishes, serrations or other surface imperfections.

Numerous alterations of the structure herein disclosed will suggest themselves to those skilled in the art. However, it is to be understood that the present disclosure relates to preferred embodiments of the present invention which are for purposes of illustration only and not to be construed as limitations of the invention.

I claim:

1. Apparatus for forming an elastomeric strip, comprising a roller, a stationary surface confronting and in spaced relation converging toward said roller, said surface and roller cooperatively defining a wedge chamber terminating in a restriction orifice, extrusion means for advancing elastomeric material under pressure to said wedge chamber, and means for defining a transition chamber intercommunicating said extrusion means and said wedge chamber, said transition chamber in one plane of cross-section having a converging portion proximate to and directed away from said extrusion means and a diverging portion remote from and directed away from said extrusion means, said transition chamber in successive downstream planes of cross-section normally of the first said plane having a medial portion which at least in said converging portion progressively narrows at a greater rate than do the respective opposite end portions of said transition chamber in said successive planes, said medial portion of said transition chamber in said successive planes passing through said diverging portion progressively widening in a direction normally of the direction it narrows in said converging portion.

2. Apparatus as claimed in claim 1, wherein said medial portion of said transition chamber in said converging portion defines a pair of opposing pointed surfaces.

* * * * *